United States Patent [19]

Marchand

[11] 4,101,304

[45] Jul. 18, 1978

[54] METHOD AND APPARATUS FOR FEEDING GLASS OUT OF A MELTING TANK TO A FLAT GLASS FORMING MEANS

[75] Inventor: Jean Marchand, Alsemberg, Belgium

[73] Assignee: BFG Glassgroup, Paris, France

[21] Appl. No.: 782,089

[22] Filed: Mar. 28, 1977

[30] Foreign Application Priority Data

Apr. 12, 1976 [GB] United Kingdom ............... 14844/76

[51] Int. Cl.² ............................................. C03B 5/04
[52] U.S. Cl. ........................................ 65/135; 65/337;
65/339; 65/346; 65/347
[58] Field of Search ...................... 65/182 R, 134, 337,
65/339, 346, 347, 135, 136

[56] References Cited

U.S. PATENT DOCUMENTS

| 3,297,423 | 1/1967 | Prislan | 65/339 X |
| 3,884,665 | 5/1975 | Edge et al. | 65/182 R X |
| 3,936,290 | 2/1976 | Cerutti et al. | 65/337 X |

*Primary Examiner*—Arthur D. Kellogg
*Attorney, Agent, or Firm*—Spencer & Kaye

[57] ABSTRACT

In the manufacture of flat glass by feeding molten glass from the outlet end of a glass melting furnace to an exit channel which conducts the molten glass to forming apparatus, the furnace sole is inclined upwardly toward the exit channel in the vicinity of the furnace outlet end.

19 Claims, 7 Drawing Figures

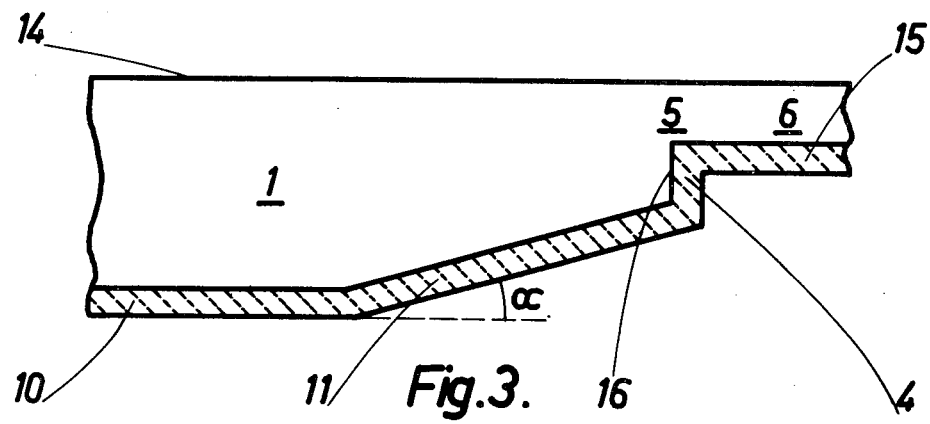
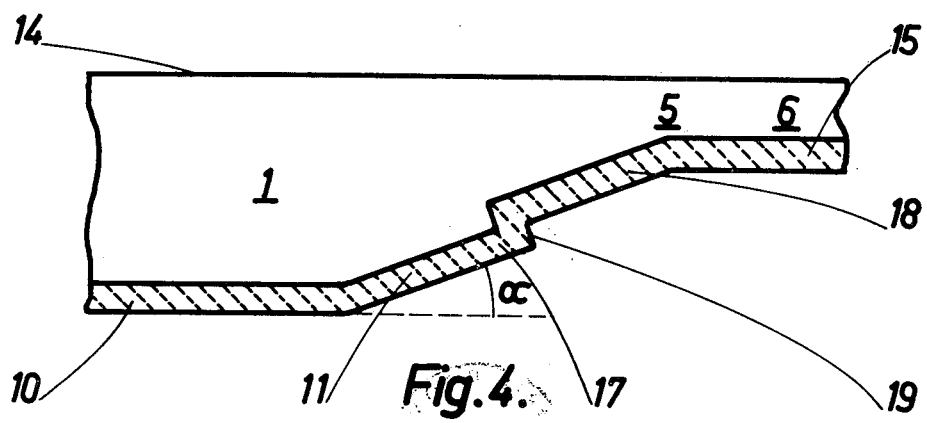
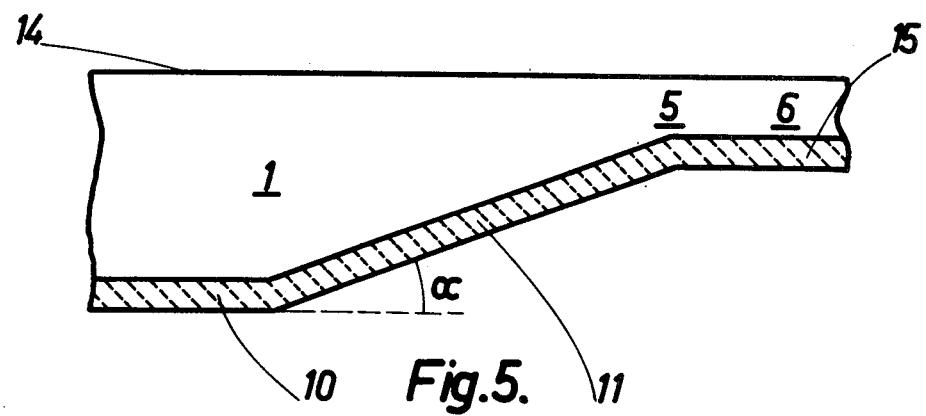

METHOD AND APPARATUS FOR FEEDING GLASS OUT OF A MELTING TANK TO A FLAT GLASS FORMING MEANS

BACKGROUND OF THE INVENTION

The present invention relates to apparatus for the manufacture of glass in sheet or ribbon form, the apparatus being of the type composed of a glass melting furnace from the end of which molten glass is fed to a narrower exit channel which supplies the glass to sheet or ribbon forming apparatus. The invention also relates to a method of manufacturing glass in sheet or ribbon form using such apparatus and to glass sheets or ribbons which have been manufactured by that method.

While such systems for feeding molten glass from a furnace to sheet or ribbon forming apparatus may be used in the manufacture of drawn glass, they are a particular feature of many float glass manufacturing processes.

As a result of convection phenomena which are apparent in the molten glass in the furnace, the current of glass which flows forward into the channel towards the sheet or ribbon forming apparatus is often not sufficiently uniform, and this lack of uniformity can cause unacceptable optical defects in the sheet of glass which is formed.

These convection phenomena arise as a result of temperature differences in the bath of molten glass in the furnace and manifest themselves as different currents in the glass. Glass in the upper part of the bath advances as a forward current towards the exit channel, and glass in the lower part of the bath flows as a return current back towards the furnace heat source. The amount of glass flowing in the forward current is in general greater than the quantity of glass which is removed from the furnace and passed to the forming apparatus, and the excess glass forms the return current.

This excess glass is in particular removed from the forward current following contact of the glass with the cool side walls of the furnace. The glass which is cooled in this way becomes denser and flows towards the sole of the furnace to feed the return current. Also, if the inlet end of the exit channel is narrower than the main body of the furnace, for example if the entrance has a width of one half or less the width of the furnace forehearth, as is disclosed, for example, in U.S. Pat. No. 3,597,178, pockets of cooler glass can be collected in the "shoulders" of the end of the furnace to either side of the channel. Glass in these shoulder corners is likewise cooled by contact with the walls, and descends to join the return current.

At the borders between the forward current and the return current, turbulent convection motion is set up, with the result that, in particular, cool currents of glass can be entrained by the forward current and passed to the sheet or ribbon forming apparatus, and this in turn has a strongly adverse effect on the optical quality of the resulting sheet or ribbon.

SUMMARY OF THE INVENTION

It is an object of the present invention to produce glass of improved quality by giving the current of molten glass flowing through the exit channel a more uniform laminar structure.

This and other objects are achieved, according to the present invention, in apparatus for the manufacture of flat glass, i.e. glass in sheet or ribbon form composed of a glass melting furnace from the outlet end of which molten glass is fed to a narrower exit channel from which the glass passes to sheet or ribbon forming apparatus, by causing at least a portion of the sole of the furnace over substantially the full width thereof, to be inclined, or sloping, upwardly towards the sole of the exit channel. The upwardly inclined furnace sole portion is thus adjacent the furnace outlet end.

When producing flat glass using such a furnace sole construction, a notable reduction in the optical defects referred to above has been noted. The use of such an inclined sole creates a very substantial reduction in those convection currents which originate in the glass close to the exit from the furnace. It is presently believed that this is due to the fact that the form of the sole forces the so-called neutral zone, where the forward and reverse currents separate, to be displaced in the upstream direction. Thus it has been found that the forward current in the zone close to the exit from the furnace becomes substantially unidirectional and regular and is composed of successive, horizontal, generally parallel layers of molten glass, and this in turn gives a generally uniform laminar form to the current flowing in the exit channel.

Preferably, the or at least one sloping portion of the sole of the furnace lies within the effective sphere of operation of cooling means. This preferred feature of the invention is particularly advantageous because it permits control of the return current. Cooling of such sloping sole portion in fact exerts a pumping action on the return current, promoting its flow in the upstream direction, i.e., away from the furnace exit, and also promotes clean separation of the forward and return currents. This pumping action helps to ensure that the return current flows back to the furnace heat source. Furthermore, the cooling action allows a reduction in the amount of glass from the return current which is susceptible of being entrained in the forward current. It will of course be appreciated that the molten glass should not be cooled to below its liquidus temperature in order to avoid the appearance of devitrification problems.

In preferred embodiments of the present invention, means are provided for insulating at least a part of the furnace roof and preferably at least that part of the furnace roof which lies above the or an inclined sole portion. In this way heat loss through the furnace roof is reduced, and this combines with the action of the sloping part of the sole to have an even greater beneficial effect on the temperature distribution in the forward current of molten glass which feeds directly to the exit channel. Thus the parallelism between the layers of molten glass forming the forward current is improved, to give a more laminar structure to the molten glass flowing in the exit channel.

Advantageously, at least one sloping portion of the sole of the furnace is provided with a discontinuity extending thereacross. The location of the neutral zone, where forward and reverse currents tend to separate, can change during the course of time for various reasons. The provision of such discontinuity stabilizes this neutral zone and can have a favorable effect on its size, thus further improving uniformity in the current of glass flowing along the exit channel.

The actual geometrical form of the sole may be smooth and continuous. For example, in embodiments of the invention including cooling means acting on the sole of the furnace, it is preferred that the sloping parts of the sole on opposite sides of such a discontinuity be formed of materials having different thermal conductivities, and preferably that part of the sole which has the higher conductivity is located upstream of the discontinuity. These features, especially when taken together, are found to have a very beneficial effect on the uniformity of the glass currents entering the exit channel, and thus also on the quality of glass produced.

However, it is preferred that the discontinuity be with respect to the geometrical form of the sole, and advantageously the discontinuity is constituted by a step in the sole of the furnace. It is presently believed that such step should be a step upwards towards the exit channel. Experiments have shown that a step 10cm high produces a very successful result, and it is believed that other step dimensions, for example as small as 5cm or as large as 15cm or even 20 or 25cm, could give good results.

Some success has been achieved with embodiments of the invention in which the sloping furnace sole terminates at a furnace end wall several centimeters below the sole of the exit channel to form a step at the entrance to that channel. In a particular case, where molten glass was to be passed to a float tank, the depth of glass in the exit channel was of the order of 35cm and the step at the entrance to the channel was 25cm high. At high production rates, for example of 700 tons per day, this step had no adverse effect, but at lower production rates, especially below 500 tons per day, turbulence was observed in the molten glass immediately upstream of the entrance to the exit channel. It was found that, if the sole of the furnace was suitably cooled in accordance with certain preferred embodiments of the invention, this turbulence did not appear until the production rate was reduced to 400 tons per day.

Preferably however, the or a sloping portion of the sole of the furnace passes smoothly into the sole of the exit channel. Of course, eliminating such a step at the entrance to the exit channel will eliminate any turbulence due to its presence.

Advantageously, such a sloping furnace sole portion forms an angle of less than 5° with the horizontal, and optimally such sloping furnace sole portion forms an angle of between 2° and 4° with the horizontal. It has been found that such angles of slope can give very good results.

Reverting to the fact that pockets of cooler glass are apt to collect in the shoulders of the end of the furnace to either side of the narrower exit channel, while the entrainment of such cooler glass into currents flowing along the exit channel is greatly reduced by using apparatus according to the invention, a further improvement can be effected if, at the exit end of the furnace, the side walls thereof converge to provide a progressive narrowing towards the entrance to the exit channel, and this accordingly constitutes a preferred feature of such apparatus.

The invention includes a method of manufacturing glass in sheet or ribbon form composed of feeding molten glass from the end of a glass melting furnace to a narrower exit channel and then to sheet or ribbon forming apparatus, in which at least a portion of the sole of the furnace over which the molten glass is fed is inclined upwardly over substantially the full width of the furnace towards the sole of the exit channel.

Preferably such a sloping portion of the sole of the furnace is cooled and, advantageously, the glass is fed over a discontinuity extending across such sloping portion of the sole of the furnace.

The invention also extends to glass which has been manufactured by the method defined above.

BRIEF DESCRIPTION OF THE DRAWINGS

FIGS. 3 to 5 are longitudinal, elevational cross-sectional views of three embodiments of furnace end and exit channel according to the invention.

It is to be emphasized that the drawings are merely diagrammatic and are not to scale.

DESCRIPTION OF THE PREFERRED EMBODIMENTS

In the operation of each illustrated embodiment, molten glass is fed from left to right from a melting furnace to sheet or ribbon forming apparatus (not shown), as typified by a float tank.

Figure 1:
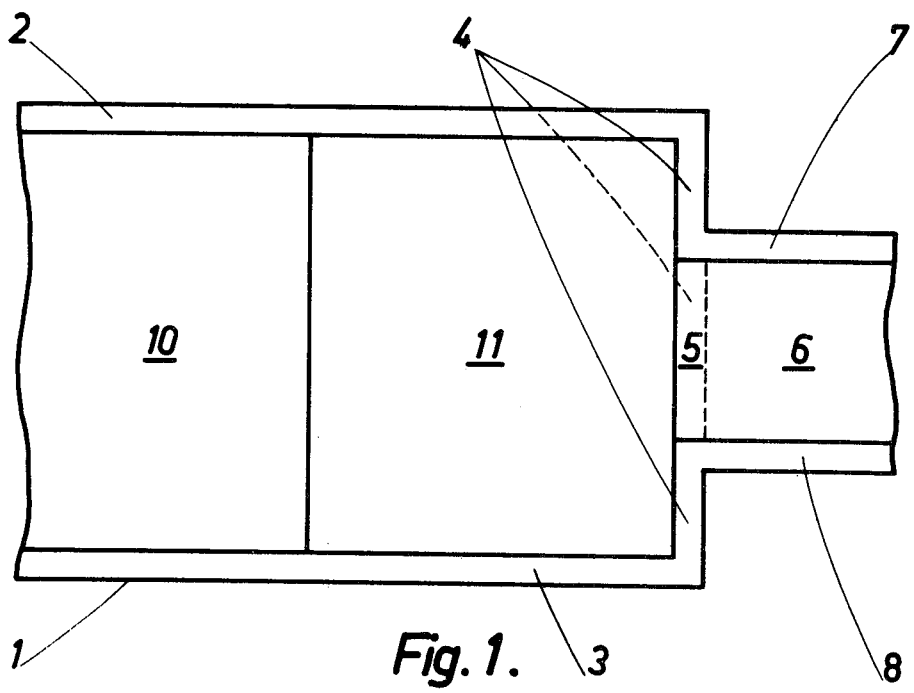
FIG. 1 is a plan view of the end of one form of a furnace and an exit channel according to the invention.

In FIG. 1, the end of the furnace, that is, its forehearth 1, has side walls 2 and 3 and terminates in an end wall 4 at right angles to the side walls and provided with an exit opening 5 which forms the entrance to an exit channel 6 having side walls 7 and 8. The sole of the forehearth 1 is formed of two portions 10 and 11, the portion nearest the melting furnace, or the upstream portion, being horizontal, while the second, or downstream, portion 11 slopes upwardly towards the sole of the exit channel 6.

Figure 2:
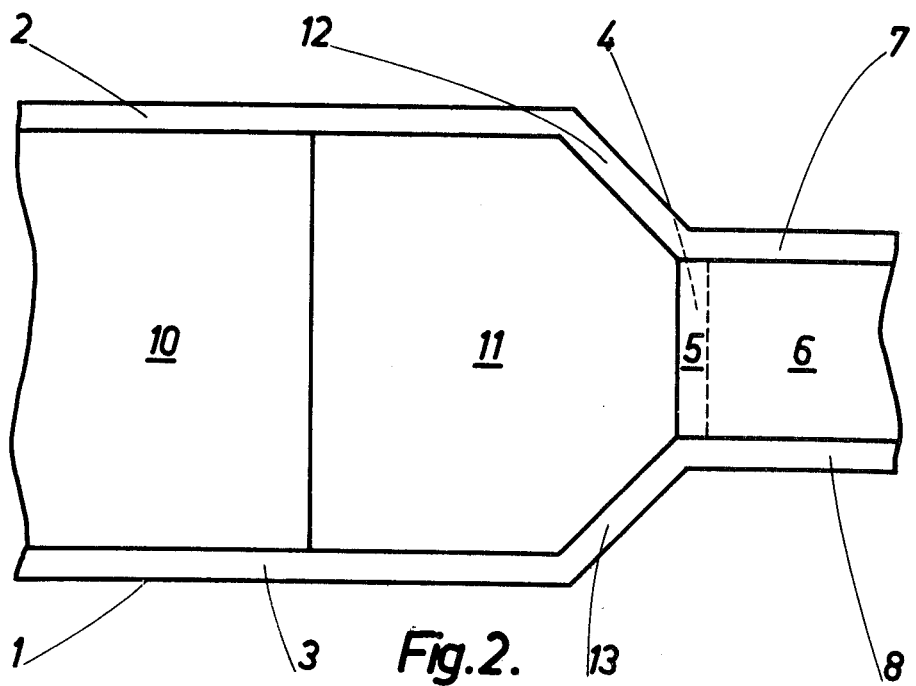
FIG. 2 is a view similar to that of FIG. 1 of an alternative form of furnace end and exit channel.

FIG. 2 is a similar view of a modified forehearth and exit channel in which similar parts have been given the same reference numerals as in FIG. 1. Instead of the forehearth 1 having an end wall 4 which extends across its full width, the side walls 2 and 3 converge at 12 and 13 to effect a progressive narrowing of the forehearth towards the exit channel 6.

FIGS. 3, 4 and 5 each show, in cross section, a forehearth 1 having a horizontal sole portion 10 and a sloping sole portion 11 which leads to an exit channel 6. The surface of the molten glass in the forehearth is indicated at 14, and the surface of the sole of the exit channel 6 is shown at 15. In each figure, the inclined portion 11 of the forehearth sole forms an angle α with the horizontal.

In the embodiment shown in FIG. 3, the inclined portion 11 of the sole of the furnace meets the end wall 4 of the furnace below the level of the exit opening 5 leading to the channel 6. Accordingly, there is a step 16 rising from the top of the inclined sole portion 11 to the sole 15 of the exit channel. In a particular practical embodiment, the apparatus may be designed to hold glass to a depth of 35cm at the entrance 5 to the exit channel, i.e. to the surface of sole 15, the step 16 is made 20cm high and the top surface of sole 15 of channel 6 is 120cm above the level of the top surface of horizontal portion 10 of the furnace sole. The inclined portion of the forehearth sole 11 starts some 20m away from the exit 5, and the angle α is therefore $\cot^{-1} 20$ or 2°52'. The maximum acceptable height of step 16 is of 40cm. To achieve best results it should not exceed 30cm.

The embodiment schematically illustrated in FIG. 3 is particularly suitable for higher rates of glass production, for example 500 to 700 tons per day or more, since at lower production rates the step 16 induces turbulence in the currents of glass at the exit 5 from the forehearth 1 and this may have a deleterious effect on the glass produced. As has previously been stated, it is possible to reduce this turbulence by cooling the inclined sole portion 11.

In order to avoid this turbulence, however, it is preferred that the inclined sole portion 11 lead continuously into the sole 15 of the exit channel 6, as is shown in FIGS. 4 and 5.

In FIG. 4, the inclined sole portion 11 is constituted of two parts 17 and 18 separated by a step 19. This step 19 provides a discontinuity in the sole and stabilizes the neutral zone where return currents separate from forward currents in the molten glass. This step 19 may, for example, be 10cm high and be located approximately 5 to 6 meters or more from the exit opening 5.

According to one example of this embodiment, the molten glass has a depth of 150cm above the horizontal sole portion 10 of the furnace and 30cm in the exit channels 5, 6. The inclined portion 11 of the furnace sole commences 13m away from the exit end and the angle α is, accordingly, 4°50'.

FIG. 5 shows an embodiment in which the inclined sole portion 11 is continuous in its geometrical form. The inclined sole portion 11 may begin wherever it is found most convenient. For example it may commence at the fining sill, typically about 34m from the exit opening 5; or at the entrance to the neck, typically about 24m from the exit opening; or at the entrance to the conditioning zone, typically about 18m from the exit opening. The angle α made by such inclined sole portions with the horizontal could then be 2°2', 2°52' or 3°49', respectively.

Figure 6:
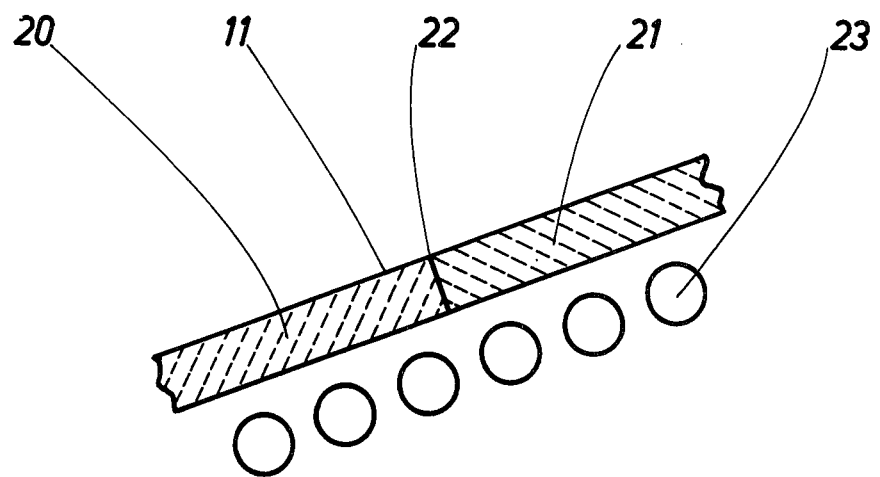
FIG. 6 is a detail cross-sectional view of a furnace sole according to the invention associated with cooling means.

A variant of the embodiment shown in FIG. 5 is shown in detail in FIG. 6. The inclined portion 11 of the sole is formed of blocks of refractory material such as 20 and 21 which meet on a line 22 extending across the sole. Cooling pipes 23, in which cooling fluid such as water can circulate, are arranged beneath the sole. If the blocks 20 and 21 on opposite sides of the line 22 are made of materials having respectively different thermal conductivities, then the line 22 will appear as a discontinuity which acts to stabilize the neutral zone in much the same manner as the structural step-discontinuity 19 shown in FIG. 4. This is particularly so when the upstream blocks such as 20, that is those further from the exit channel, have the higher thermal conductivity.

Such a thermal discontinuity can be built into any embodiment of the invention in which the inclined portion 11 of the sole of the forehearth 1 is cooled. For example in the embodiment shown in FIG. 4, it would be possible, with advantage, to cool the sole portion 11 and have its two parts 17 and 18 made of a higher conductivity refractory material and a lower conductivity refractory material, respectively.

The higher conductivity refractory material has a conductivity of about at least 1.5 times the conductivity of the lower conductivity material.

Figure 7:
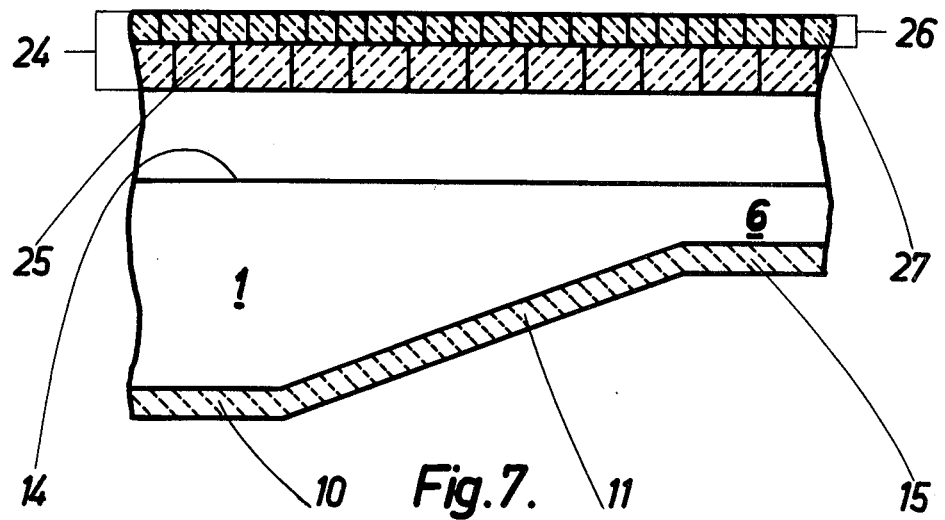
FIG. 7 is an elevational, cross-sectional view of a further embodiment of the invention.

FIG. 7 shows a forehearth 1 of a furnace connected to an exit channel 6, the furnace having a horizontal sole portion 10 and a sloping portion 11 leading up to the sole 15 of the exit channel 6. The level of the surface of molten glass is shown as before at 14. The furnace has a conventional vaulted roof 24 composed of refractory blocks 25 and this is covered with an insulating layer 26 made up of porous silica bricks 27. The effect of this insulating layer 26 is to reduce heat loss through the furnace roof, and thus promote a more uniform laminar form in the forward current of molten glass flowing into the exit channel.

It will be understood that the above description of the present invention is susceptible to various modifications, changes and adaptations, and the same are intended to be comprehended within the meaning and range of equivalents of the appended claims.

What is claimed is:

1. In apparatus for the manufacture of flat glass including a glass melting furnace having a sole and an outlet end from which molten glass flows out of the furnace, and means defining an exit channel having a sole and disposed adjacent the furnace to receive molten glass from the furnace outlet end and to deliver the molten glass to forming apparatus, the width of the exit channel being less than that of the furnace, the improvement wherein at least a portion of said sole of said furnace, adjacent the outlet and thereof and over substantially the full width thereof, is inclined upwardly at an angle of about 2° to b 5° from the bottom of said furnace continuously towards said sole of said exit channel.

2. Apparatus as defined in claim 1 further comprising cooling means located to have a cooling effecct on at least a part of said inclined portion of said furnace sole.

3. Apparatus as defined in claim 1 wherein said furnace is provided with a roof and further comprising means located for insulating at least a part of said furnace roof.

4. Apparatus as defined in claim 3 wherein said means for insulating are located for insulating at least that part of said furnace roof which lies above at least part of said sole portion.

5. Apparatus as defined in claim 1 wherein said inclined sole portion is provided with a discontinuity extending across its width.

6. Apparatus as defined in claim 5 further comprising cooling means located to have a cooling effect on at least a part of said inclined portion of said sole of said furnace in the region of said discontinuity and said inclined sole portion is constituted, at opposite sides of said discontinuity, of materials having respectively different thermal conductivities.

7. Apparatus as defined in claim 6 wherein the higher conductivity sole material is located upstream of said discontinuity.

8. Apparatus as defined in claim 5 wherein said discontinuity is in the geometrical form of said inclined sole portion.

9. Apparatus as defined in claim 8 wherein said discontinuity is formed by a step in said inclined sole portion.

10. Apparatus as defined in claim 9 wherein said step is between 5 and 25cm high.

11. Apparatus as defined in claim 9 wherein said step is a step upward toward said exit channel.

12. Apparatus as defined in claim 11 wherein said step is between 5 and 25cm high.

13. Apparatus as defined in claim 1 wherein said inclined sole portion is disposed to form a smooth transition with said sole of said exit channel.

14. Apparatus as defined in claim 13, wherein said inclined sole portion forms an angle of between 2° and 4° with the horizontal.

15. Apparatus as defined in claim 1 wherein at the exit end of said furnace the side walls thereof converge to progressively narrow said furnace toward said exit channel.

16. In a method of manufacturing flat glass by feeding molten glass from the outlet end of a glass melting furnace via a forehearth to a narrower exit channel and conducting the glass to flat glass forming apparatus, the improvement wherein said step of feeding comprises causing glass to flow, in the forehearth, over a sole which is inclined upwardly at an angle of about 2° to 5° over substantially the full width of the forehearth toward the exit channel.

17. A method as defined in claim 16 further comprising cooling the inclined sole portion.

18. A method as defined in claim 16 wherein the inclined sole portion has a discontinuity extending across the width of the furnace.

19. In a method of manufacturing flat glass by feeding molten glass from the outlet end of a glass melting furnace via a forehearth to a narrower exit channel and conducting the glass to flat glass forming apparatus, the improvement wherein said step of feeding comprises causing the depth of the molten glass in the forehearth of the furnace to decrease gradually and uniformly at an inclination of about 2° to 5° in the vicinity of the furnace outlet end and in the direction toward the exit channel.

* * * * *